Figure 7:
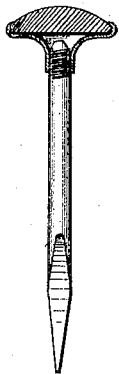
Figure 8:

*L. Wolf,*
*Picture Nail.*
No. 112,880. Patented Mar. 21, 1871.
Fig. 1
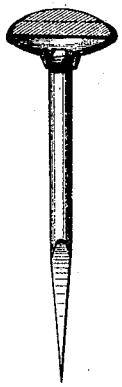
Fig. 2
Fig. 3
Fig. 4
Fig. 5
Fig. 6
Witnesses:
Inventor:
L. Wolf
PER Munn & Co
Attorneys.

*L. Wolf,*
*Picture Nail.*

No. 112,880.      Patented Mar. 21, 1871.

Witnesses:
A. W. Almqvist
D. S. Mabee

Inventor:
L. Wolf
Per Munn & Co
Attorneys.

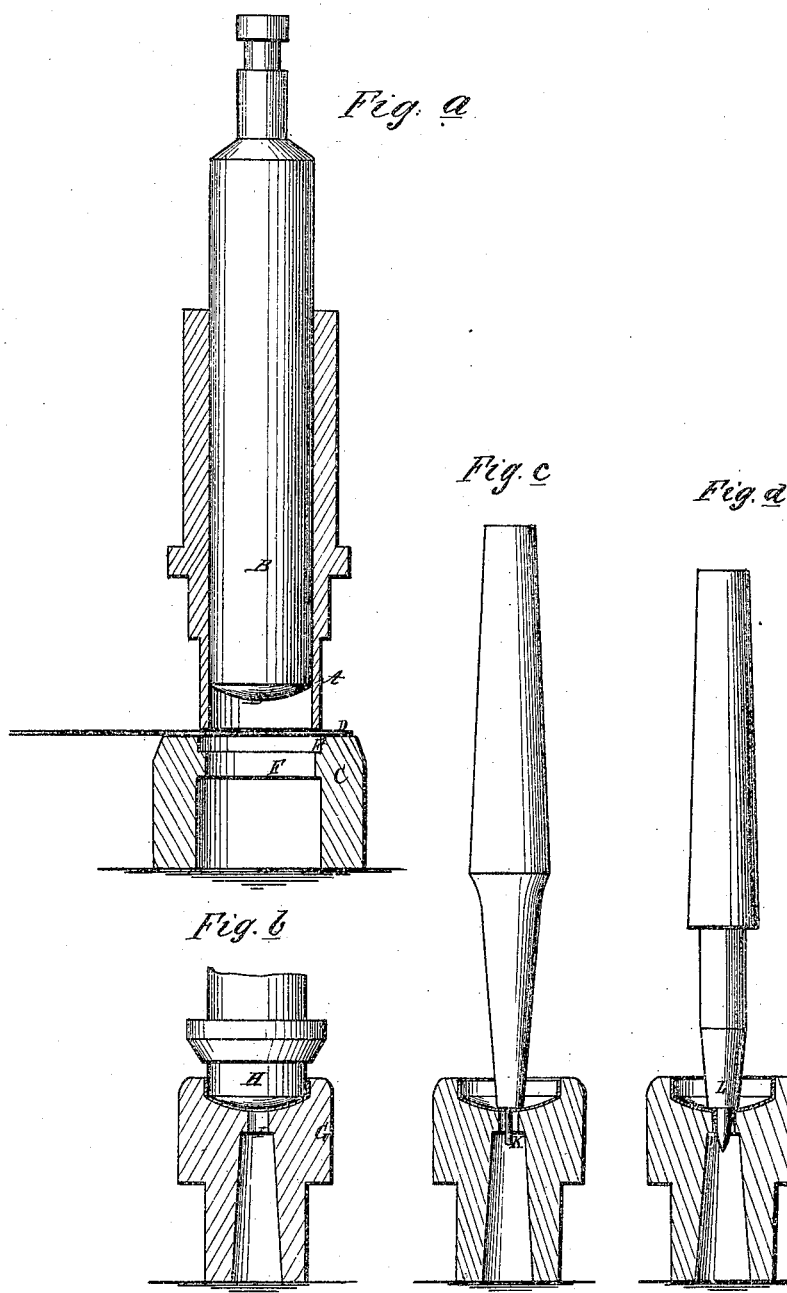

United States Patent Office.

LEOPOLD WOLF, OF MERIDEN, CONNECTICUT, ASSIGNOR TO THE MERIDEN MALLEABLE IRON COMPANY, OF SAME PLACE.

Letters Patent No. 112,880, dated March 21, 1871.

IMPROVEMENT IN MECHANISMS FOR MANUFACTURING HEADS FOR PICTURE-NAILS.

The Schedule referred to in these Letters Patent and making part of the same.

*To all whom it may concern:*

Be it known that I, LEOPOLD WOLF, of Meriden, in the county of New Haven and State of Connecticut, have invented new and useful Improvements in Manufacture of Picture-Nail Heads; and I do hereby declare that the following is a full, clear, and exact description thereof, which will enable others skilled in the art to make and use the same, reference being had to the accompanying drawing forming part of this specification.

My invention relates to the caps for the heads of picture-nails, and consists in a series of dies used successively in bringing them to a state of completion.

I will first describe my invention in connection with all that is necessary to a full understanding thereof, and then clearly point it out in the claim.

In sheet 1 of the drawing I have represented, in Figures 1 to 6, inclusive, a finished nail with a cup constructed by my improved mode, and views of the cup as it appears after each operation, showing the number of operations, except the annealings, to be performed.

In sheet 2 I have represented, in Figures 7 to 14, inclusive, the finished nail, with the cup made in the old way, and views of the cup after each operation, showing the number of operations, except the annealings, to be performed by the old mode.

Figures $a$, $b$, $c$, and $d$ are sectional views of the dies which I use for cutting and shaping the cups.

Similar letters of reference indicate corresponding parts.

Figure 9:
Figure 10:
Figure 11:
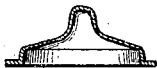
Figure 12:
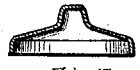
Figure 13:
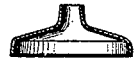

Hitherto these cups have been formed by stamping in drop-presses after the disks are cut out of the sheet metal, the first blow of the drop producing the shape shown in section in fig. 9; the second blow the shape shown in fig. 10, and so on, to and including the finished form represented in fig. 13.

Figure 14:

The operation represented by fig. 14 is that of cutting the thread in the tubular neck $b$ for the screw-threaded shank of the nail. These stamping operations so condense and harden the metal that, to prevent breaking, the blank is required to be annealed four times, which, together with the cutting out, milling, and stamping down upon the porcelain head, makes twelve distinct operations in making the picture-nail head in the way now practiced, and completing the nail. Besides this, the stamping so condenses and reduces the metal in thickness that it is necessary to use more metal to make the cap than is required by my improved mode, which consists in "drawing" the blank into the requisite shape by a gradual action upon the same in the dies of a hand or power-press, which is distinguished from the drop-press in being arranged so that the male punch has a slow movement, by which the blank is gradually drawn or pressed into shape in such a way that the metal is not subjected to the condensing and hardening effect due to the powerful blow of a drop-press, which admits of accomplishing more toward producing the required form at one operation than can be done in a drop-press, and saves the necessity of annealing so often.

Under the slow movement of the punch the metal can be drawn and changed in shape to a greater extent, without tearing or cutting, than under the drop-press, by reason of the lessened friction of the parts moving in contact, and the lessened tension of the metal, due to the greater time occupied in the shaping. Thereby I am enabled to dispense with some of the operations of the dies now required to reduce the blank to the requisite form, also with some of the annealings.

My improved mode of operation is as follows:

With a tubular male die, A, and another male die, B, arranged in a lever or other press, to have slow drawing motion, and to operate in conjunction with the cutting and drawing female die C.

The blank $a$ is first cut out by causing the tubular die A to move down upon the metal sheet D, lying above the female die, against the edge E of which it is cut.

The blank is then forced down upon the top of the annular ring F by the punch A; then the cylindrical punch B, having a convex end, B', is caused to move down in like manner upon the blank and force it through the contracted space within the ring F, by which the shape represented in fig. 3 is imparted to it, or very nearly this shape.

The cup is then placed in the cup-shaped die G and subjected to the action of the die H, which is of the same form in the part operating on the blank as the die B is. These dies complete the form of the cup in case of any lacking in the same, which may sometimes be the case in consequence of there being no bottom to the die C, for pressing the top of the cap to impart the shape to the top and at the angle between the side and top.

The die H is actuated in the same way that the others are, to perform the work by a slow movement instead of a blow.

The die H being withdrawn, and the blank either remaining in the die G, which may have the hole I through the bottom for the punches, by which the subsequent operations are performed, or removed to a similar one, is subjected to the action of the punch K to form the small hole $e$, as a preliminary step to forming the projection $d$ for the attachment of the shank of the nail by screwing into it in the ordinary way.

Next, the punch L is used after punch K is withdrawn, said punch L being pointed at the end sufficiently to enter the male hole made by punch K, and above the point it is made large enough to stretch the metal; at the same time it forces it downward as much as will be admitted by the hole I, which is arranged as to size to correspond with the punch and the size of the hollow projection.

The blank formed in this way is only annealed once, which may either be after the first or second operation, preferably the second, which is the one performed by the die H.

This completes the shaping operation of the cup, which, then being screw-tapped in the projection d, is ready for attachment.

Having thus described my invention,

I claim as new and desire to secure by Letters Patent—

The series of pairs of dies represented in figs. a b c d of drawing, when jointly applied on the method herein described, for the manufacture of caps for the heads of picture nails.

LEOPOLD WOLF.

Witnesses:
 ORVILLE H. PLATT,
 GEORGE A. FAY.